United States Patent [19]

Lewarchik et al.

[11] Patent Number: 5,185,403
[45] Date of Patent: Feb. 9, 1993

[54] THERMOSETTING ACRYLIC POLYMERS AND COATING COMPOSITIONS CONTAINING SAID ACRYLIC POLYMERS AND FLUOROCARBON RESINS

[75] Inventors: Ronald J. Lewarchik, Sleepy Hollow, Ill.; Edward J. Holzrichter, Redlands, Calif.; Marc L. Smith, Highland, Calif.; Jack C. Allman, Riverside, Calif.

[73] Assignee: Morton Coatings, Inc., Chicago, Ill.

[21] Appl. No.: 740,039

[22] Filed: Jul. 31, 1991

[51] Int. Cl.$^5$ ............................................. C08L 27/12
[52] U.S. Cl. .................................... 525/199; 525/204; 526/260
[58] Field of Search ................. 526/260; 525/199, 204

[56] References Cited

U.S. PATENT DOCUMENTS 3,037,006  5/1962  Hankins et al. .................... 526/260
3,779,976  10/1971  De Marsico et al. ............... 525/199

*Primary Examiner*—Joseph L. Schofer
*Assistant Examiner*—Alex H. Walker
*Attorney, Agent, or Firm*—Wayne E. Nacker; Gerald K. White

[57] ABSTRACT

The invention provides novel acrylic resins particularly useful for formulating polyvinylidene fluoride/thermosetting acrylic polymer coating compositions. The acrylic polymer is comprised of (a) acrylic acids and acrylic esters having no additional functionality, (b) acrylic acids and acrylic esters having additional functionality by which the acrylic polymer may be crosslinked, and (c) an acryloxyalkyl oxizolidine.

6 Claims, No Drawings

THERMOSETTING ACRYLIC POLYMERS AND COATING COMPOSITIONS CONTAINING SAID ACRYLIC POLYMERS AND FLUOROCARBON RESINS

The present invention is directed to novel acrylic thermosetting copolymers and to compositions in which the acrylic polymers are used as carriers for fluorocarbon resins. The coatings are particularly useful in coil coating processes.

BACKGROUND OF THE INVENTION

Fluorocarbon resins, such as polyvinylidene fluoride (PVDF), are useful in formulating coatings with excellent weathering resistance. Because fluorocarbons have poor rheology and pigment wetting characteristics, it is common to add a modifying polymer to fluorocarbon coating compositions. A typical binder polymer is an acrylic polymer, and both thermosetting and thermoplastic acrylics resins have been utilized for this purpose.

U.S. Pat. No. 3,779,976, for example, describes combinations of polyvinyl fluoride and an acrylic resin, e.g., a copolymer of methyl methacrylate and 3-(2-methacryloxyethyl)-2,2-spirocyclohexyl oxazolidine. The compositions described in U.S. Pat. No. 3,779,976 contain no cross-linker; thus the acrylic polymers in this patent are thermoplastic resins.

Coatings containing fluorocarbons and thermosetting resins, wherein the acrylic polymers have functionality that renders them cross-linkable, and in which a cross-linker is included in the resin composition, are sold by several coating producers. Thermosetting binder polymers are preferred for many applications because of the improved mechanical and chemical resistance they provide.

To achieve optimal weathering and chemical resistance, high fluorocarbon resin content is required. Many coating applications call for coating compositions in which the fluorocarbon resin comprises 70 wt. % or more of the resin and the binder polymer the remainder. Coating compositions containing fluorocarbon resins, particularly PVDF, and thermosetting acrylic resins tend to have relatively high viscosities at the solids levels used. For some coating applications, particularly coil coating, it would be desirable to have high fluorocarbon resin content in conjunction with a thermosetting acrylic resin, but with lower viscosity than currently used compositions.

SUMMARY OF THE INVENTION

In accordance with the invention, a coating composition comprises a fluorocarbon resin, a cross-linkable acrylic binder polymer and a cross-linking agent for reaction with the acrylic binder polymer. The binder polymer is formed from acrylic monomers that include (a) acrylic esters having no additional functionality, (b) acrylic esters such as 2-hydroxyethyl methacrylate, 2-hydroxypropyl methacrylate, 2-hydroxyethyl acrylate, and acetoacetoxyethyl methacrylate having functionality for reaction with cross-linking agents, such as aminoplasts, phenoplasts, isocyanates, etc., and (c) acryloxyalkyl-oxazolidines which function to lower the viscosity of the fluorocarbon resin-based coating composition.

DETAILED DESCRIPTION OF CERTAIN PREFERRED EMBODIMENTS

Herein, unless stated otherwise, components of the coating composition will be stated in parts per hundred resin (phr) based upon the total weight of the fluorocarbon resin and the acrylic polymer; monomer components of polymers are expressed as mole percentages; and other percentages expressed are by weight.

Suitable fluorocarbon resins for use in the invention include polyvinylidine fluoride, such as those sold under the tradename Kynar; polyvinyl fluoride, polytetrafluoroethylene; copolymers of vinylidene fluoride and tetrafluoroethylene, such as that sold under the trademark Kynar SL; a fluoroethylene/vinyl ester/vinyl ether sold under the trademark Fluonate; proprietary vinylidene fluoride-based polymers sold under the trademarks Kynar 500 and Kynar SL; and mixtures of fluorocarbon resins. The fluorocarbons are high molecular wt., typically having molecular weights (weight average) above 250,000. The fluorocarbon resins are utilized in powder form. The powders are insoluble in the solvents used in the coating compositions of the present invention, but are swelled by the solvents. The fluorocarbon resin comprises between about 40 and 90 phr of the polymer, typically between about 70 and about 80 phr. 70 phr is considered to be near optimal for chemical and mechanical resistance. Above 70 phr, minor improvements in chemical and mechanical resistance may be achieved, but with increasing costs due to the high cost of the fluorocarbon resins.

The acrylic modifying resin, used at a level of between about 10 and about 60 phr, assists in film formation and further disperses the pigments and fillers, if used.

In accordance with the present invention, a unique acrylic binder polymer is provided which is formed from three types of acrylate monomers. The first type of acrylate monomer (a) is an acrylic ester having no additional functionality. This monomer has the general

$$R^1_2C=CR^2-COOR^3$$

wherein The $R^1$s and $R^2$ are the same or different and are each selected from —H and $C_1$-$C_3$ alkyl and $R^3$ is $C_1$-$C_6$ alkyl. Examples of this type (a) of acrylate monomer include methyl methacrylate, ethyl methacrylate, ethyl acrylate, methyl acrylate, butyl acrylate and butyl methacrylate.

The second type of acrylate monomer (b) is an acrylic acid ester having additional functionality, such as hydroxyl, or beta-diketone functionality which makes it cross-linkable with across-linking agents, such as aminoplast resins. These acrylates have the general formula:

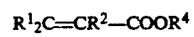
$$R^1_2C=CR^2-COOR^4$$

wherein the $R^1$s and $R^2$ are the same or different and are selected from —H, $C_1$-$C_3$ alkyl, and $R^4$ is the residue of an alcohol having additional —OH or beta-diketone functionality. More specifically, —$R^4$ is preferably the residue of a $C_2$ or $C_3$ glycol or has the formula:

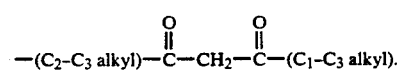
$$-(C_2\text{-}C_3 \text{ alkyl})-\overset{O}{\underset{\|}{C}}-CH_2-\overset{O}{\underset{\|}{C}}-(C_1\text{-}C_3 \text{ alkyl}).$$

Examples of this type (b) of acrylate monomer include 2-hydroxyethyl methacrylate, 2-hydroxyethyl acrylate, 2-hydroxypropyl acrylate, 2-hydroxypropyl methacrylate and acetoacetoxyethyl methacrylate.

The third type (c) of acrylic monomer is an acryloxyalkyl oxazolidine, as described in U.S. Pat. No. 3,037,006, the teachings of which are incorporated herein by reference. Specifically, acryloxyalkyl-oxazolidine useful in the invention have the formula:

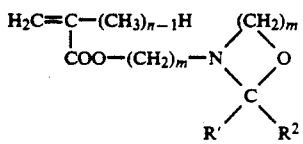

where R:
n is an integer having a value of 1 to 2,
m is an integer having a value of 2 to 3,
$R'$, when not directly joined to $R^2$, is selected from the group consisting of hydrogen, phenyl, benzyl, and ($C_1$-$C_{12}$) alkyl groups, $R^2$, when not directly joined to $R^1$, is selected from the group consisting of hydrogen and ($C_1$-$C_4$) alkyl groups, and $R'$ and $R^2$, when directly joined together, form a 5- to 6-carbon ring with the attached carbon atom of the ring in the formula, i.e., $R'$ and $R^2$, when joined together, are selected from the group consisting of pentamethylene and tetramethylene.

As representative of this type (c) of monomer is 3-(2-methacryloxyethyl)-2,2-spirocyclohexyl oxazolidine (MESO).

The first type (a) monomer provides flexibility to the polymer and is used at between about 85 and about 97 mole percent. This first type (a) monomer is necessary to provide the cured coating with weather resistance and toughness. The second type (b) monomer enables the acrylate polymer to be cross-linked and is used at between about 2 and about 10 mole percent. The third type (c) monomer is used to reduce the viscosity of a fluorocarbon resin/thermosetting acrylic polymer coating composition. It is also believed that this type (c) of acrylic monomer helps to render the acrylic polymer more compatible with the fluorocarbon resin and thereby stabilizes the viscosity of the fluorocarbon resin/acrylic resin coating composition. This type (c) monomer is used in the acrylate polymer at between about 1 and about 5 mole percent.

The acrylic resin polymers have weight average molecular weights of between about 4,000 and about 50,000, preferably in the range of about 20,000.

In addition to lowering the viscosity of the coating composition, the novel acrylic polymer of the present invention provides coatings with improved mechanical and chemical resistance. This allows either the use of a lower level of expensive fluorocarbon resin and/or helps ensure that the coating will pass the requisite tests. A standard test for acceptable film formation is a methylethyl ketone (MEK) double rub test in which a coating must withstand a predetermined number of rubs with an MEK-saturated fabric.

The coating composition contains a cross-linking agent for the acrylic polymer. This may be an aminoplast resin, such as a melamine/formaldehyde resin or a melamine urea resin. Other suitable cross-linking agents include isocyanates, blocked isocyanates, organosilanes, and glycol ureas. The cross-linking agent is generally selected to be substantially non-reactive with the acrylic polymer at ambient temperatures, but to cross-link the same at an elevated curing temperature, e.g., the temperature of the substrate to which the coating composition is applied. The cross-linking agent is typically employed at between about 1.5 and about 10.0 phr relative to the total amount of the fluorocarbon resin and acrylic polymer.

The coating compositions of the present invention are borne in an organic solvent or mixture of solvents, particularly hydrocarbon solvents such as xylene and isophorone. Solids levels are generally between about 30 and about 50 percent. Solid levels between about 33 and about 38 percent currently being most typical.

The coating composition may be clear when used, for example, as a clear coat over a color coat. It may also contain pigments and fillers up to about 18 phr. Both underlying color coat and overlaying clear coat may be formulated in accordance with the invention. The coating may be applied to a bare metal surface, but is preferably applied to metal which has been first coated with a primer coat. Suitable primers include acrylics, polyesters, and epoxies crosslinked with melamines, blocked isocyanates and phenolics.

Coating compositions in accordance with the present invention may be applied to substrates by a variety of processes. However, the coating compositions are particularly formulated for and useful in coil coating processes. In reverse roll coil coating, the coating compositions are typically applied at peak metal temperatures (PMT) of between about 465–480° F. (241–249° C.). Dwell time at PMT ranges from about 20 to about 60 sec. If the coatings are applied by spray, cure temperatures are similar, but substantially longer cure times are required due to larger metal mass, e.g., about 20 minutes.

The invention will now be described in greater detail by specific examples.

EXAMPLE 1

A polymer is prepared using the following ingredients:

| INGREDIENTS | GRAMS |
|---|---|
| isophorone (solvent) | 150.0 |
| xylene (solvent) | 641.5 |
| propylene carbonate (solvent) | 600.6 |
| methyl methacrylate | 606.3 |
| acetoacetoxyethyl methacrylate (AAEM) | 70.0 |
| 15% 3-(2-methacryloxyethyl)-2,2-spirocyclohexyl oxazolidine (MESO)/ 85% methyl methacrylate solution | 304.9 |
| Vazo 67 (initiator) | 6.8 |
| xylene | 28.9 |
| Vazo 67 (initiator) | 12.0 |
| xylene | 21.1 |
| xylene | 58.5 |

(Ingredients listed multiple times if added in separate charges).

The isophorone, xylene and propylene carbonate were charged to a three liter resin reaction flask equipped with an agitator, condenser, thermometer, inert gas inlet, and addition funnel. The reactor was flushed with nitrogen and the charge was heated to 103° C. A premix of the methyl methacrylate, 3-(2-methacryloxyethyl)-2,2-spirocyclohexyl oxazolidine, acetoacetoxyethyl methacrylate, and 6.8 grams of Vazo 67 was made and placed in the addition funnel and was added to the reactor over a three hour period maintaining the temperature at 103° C.

After the addition was complete, the reactor contents were held at 107° C. for thirty minutes. The reaction mixture was then cooled to 99° C., and the conversion of monomer to polymer was completed by making six additions, one every thirty minutes, each consisting of 2.0 grams of Vazo 67 and 3.5 grams of xylene. After a final post-cook of thirty minutes, the polymer was cooled and packaged.

The resulting polymer solution had a solids content of 2.6%. amine value of 11.6 (mg KOH/gram resin solids), viscosity of Z1, and weight per gallon of 8.85 lbs (1.06 Kg/liter).

EXAMPLE 2

Another composition utilizing the hydroxyl functional monomer, HEMA, in place of acetoacetoxyethyl methacrylate was made according to the procedure described in Example 1 above, but following the compositions listed below:

| INGREDIENTS | GRAMS |
|---|---|
| isophorone | 74.1 |
| xylene | 331.3 |
| propylene carbonate | 296.6 |
| methyl methacrylate | 314.9 |
| 2-hydroxyethyl methacrylate (HEMA) | 19.4 |
| 15% 3-(2-methacryloxyethyl)-2,2-spirocyclohexyl oxazolidine (MESO)/ 85% methyl methacrylate solution | 150.7 |
| Vazo 67 | 3.4 |
| xylene | 14.2 |
| Vazo 67 | 6.0 |
| xylene | 10.4 |
| xylene | 28.9 |

The resulting polymer solution had a solids content of 42.1%, amine value of 5.3 (mg KOH/gram resin solids), visosity of Z1, and theoretical hydroxyl number of 17.1.

EXAMPLE 3

Coatings were made from each of the above polymers using various ratios of fluorocarbon resin to acrylic resin and at various melamine levels.

A white pigment dispersion was made by sand milling a mixture of 27.48 grams of TiO₂, 774 grams of the polymer from Example 1, 8.51 grams of isophorone, 1.27 grams of xylene, 2.33 grams of a wax solution, and 3.05 grams of an antioxidant to a Hegman reading of 7+.

A fluorocarbon dispersion was made by combining 2.85 grams of the polymer from Example 1, 14.3 grams of isophorone, and 16.2 grams of fluorocarbon resin and grinding to a Hegman reading of 5.5.

Coatings were made by mixing these two dispersions in various ratios to provide fluorocarbon/acrylic ratios of 70/30, 60/40, and 50/50 and then adding hexamethoxymethyl melamine to portions of each to provide concentrations of 2.5, 5.0, and 15.0% melamine based on acrylic polymer solids.

The coating compositions were applied to steel panels and baked 55 seconds at 305° C. to yield 0.75–0.85 mil (.019–.022 mm) films. These films were compared to control films made with an acrylic polymer which did not contain a functional group which is reactive with melamine resins (acetoacetoxyethyl methacrylate or an hydroxyl containing monomer).

Films were likewise prepared using the polymer of Example 2.

MEK (methylethyl ketone) resistance of the film was then measured and is shown below as the number of double rubs to film failure:

TABLE 1

| ACRYLIC POLYMER/% MELAMINE | FLUOROCARBON/ ACRYLIC RATIO | | |
|---|---|---|---|
| | 70/30 | 60/40 | 50/50 |
| Polymer of Example 1/2.5% | — | — | — |
| Polymer of Example 1/5.0% | — | 100+ | — |
| Polymer of Example 1/15.0% | 100+ | 100+ | 100+ |
| Polymer of Example 2/2.5 | — | 20 | 20 |
| Polymer of Example 2/5.0% | — | 100+ | 100+ |
| Polymer of Example 2/15.0% | 100+ | 100+ | 100+ |
| Control Acrylic/0% | 100+ | 20 | 10 |

While the invention has been described in terms of certain preferred embodiments, modifications obvious to one with ordinary skill in the art may be made without departing from the scope of the invention.

Various features of the invention are set forth in the following claims.

What is claimed is:

1. A coating composition comprising between about 40 and about 90 phr of a fluorocarbon resin, between about 10 and about 60 phr of an acrylic binder polymer and between about 1.5 and about 10.0 phr of a cross-linking agent, said acrylic binder polymer being formed from a mixture of acrylic monomers comprising:

(a) between about 85 and about 97 mole percent of a monomer having the formula:

$$R^1{}_xC{=}CR^2{-}COOR^3$$

wherein The R¹s and R² are the same or different and are each selected from —H and C₁–C₃ alkyl and R³ is C₁–C₆ alkyl, (b) between about 2 and about 10 mole percent of a monomer having the formula:

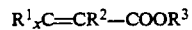

wherein the R¹'s and R² are the same or different and are selected from —H, C₁–C₃ alkyl, and R⁴ is the residue of an alcohol having additional —OH or beta-diketone functionality, and, (c) between about 1 and about 5 mole percent of an acryloxyalkyl-oxazolidine.

2. A coating composition according to claim 1 wherein said monomers of said acrylic binder composition comprise methyl methacrylate, 2-hydroxyethyl methacrylate and 3-(2-methyacryloxyethyl)-2,2-spirocyclohexyl oxazolidine.

3. A coating composition according to claim 1 wherein said monomers of said acrylic binder composition comprise methyl methacrylate, acetoacetoxyethyl methacrylate and 3-(2-methacryloxyethyl)-2,2-spirocyclohexyl oxazolidine.

4. A coating composition according to claim 1 wherein said fluorocarbon resin, said acrylic binder polymer and said cross-linking agent are borne in an organic solvent.

5. A coating composition according to claim 4 having between about 30 and about 50 percent solids.

6. A coating composition according to claim 1 further comprising up to about 18 phr pigments and fillers.

* * * * *

UNITED STATES PATENT AND TRADEMARK OFFICE
CERTIFICATE OF CORRECTION

PATENT NO. : 5,185,403
DATED     : 9 February 1993
INVENTOR(S) : Lewarchik et al.

It is certified that error appears in the above-identified patent and that said Letters Patent is hereby corrected as shown below:

At column 1, line 21, "acrylics" should be -- acrylic --.

At column 2, line 53, "across-linking" should be -- cross-linking --.

At column 5, line 12, "2.6%." should be -- 42.6%, --.

At column 6, line 35, "$R^1_x C=CR^2-COOR^3$" should be -- $R^1_2 C=CR^2-COOR^3$ --.

At column 6, 1.41, after "monomer having the formula:", the following should be added:  -- $R^1_2 C=CR^2-COOR^4$ --.

Signed and Sealed this

Eighth Day of March, 1994

BRUCE LEHMAN

Attest:

Attesting Officer

Commissioner of Patents and Trademarks